US007620410B2

(12) United States Patent
Takizawa et al.

(10) Patent No.: US 7,620,410 B2

(45) Date of Patent: Nov. 17, 2009

(54) BROADCAST STATION SYNCHRONIZATION METHOD AND MOBILE TERMINAL

(75) Inventors: Kazuyuki Takizawa, Chigasaki (JP); Ikuya Arai, Yokohama (JP); Kazuo Sakiyama, Heverlee (BE)

(73) Assignee: Renesas Technology Corp., Tokyo (JP)

( * ) Notice: Subject to any disclaimer, the term of this patent is extended or adjusted under 35 U.S.C. 154(b) by 681 days.

(21) Appl. No.: 11/260,083

(22) Filed: Oct. 28, 2005

(65) Prior Publication Data

US 2006/0105703 A1 May 18, 2006

(30) Foreign Application Priority Data

Oct. 29, 2004 (JP) ............................ 2004-315589

(51) Int. Cl.
*H04B 7/00* (2006.01)

(52) U.S. Cl. ....................... 455/502; 455/503; 370/509; 370/110; 381/107; 381/119; 700/94

(58) Field of Classification Search ................. 455/502; 370/509, 110; 381/107, 119; 700/94
See application file for complete search history.

(56) References Cited

U.S. PATENT DOCUMENTS 4,268,722 A * 5/1981 Little et al. ................. 370/338
2001/0046241 A1 * 11/2001 Shimosakoda .............. 370/509
2003/0043814 A1 * 3/2003 Lee ......................... 370/395.6

FOREIGN PATENT DOCUMENTS

JP 2004-23136 1/2004
WO 2004/093389 10/2004

* cited by examiner

*Primary Examiner*—Matthew D Anderson
*Assistant Examiner*—Adel Youssef
(74) *Attorney, Agent, or Firm*—Antonelli, Terry, Stout & Kraus, LLP.

(57) ABSTRACT

A broadcast station synchronization method in a mobile terminal operating with a system clock different from the reference clock of a broadcast station, wherein a clock synchronized with the broadcast station is reproduced according to an internal reference clock corrected by the reference time information from the broadcast station, a difference between an elapsed time at a predetermined time interval and the audio reproduction time is detected, the audio reproduction time is adjusted to cancel the difference, and the PCM transmission for reproducing the audio uses a signal indicating the PCM data transmission completion as a trigger for latching the internal reference clock count unit reproducing the clock synchronized with the broadcast station so as to acquire the clock time synchronized with the broadcast station of the same period as the audio reproduction time per a predetermined period, thereby performing synchronization with the broadcast station.

3 Claims, 8 Drawing Sheets

BROADCAST STATION SYNCHRONIZATION METHOD AND MOBILE TERMINAL

INCORPORATION BY REFERENCE

The present application claims priority from Japanese application JP2004-315589 filed on Oct. 29, 2004, the content of which is hereby incorporated by reference into this application.

BACKGROUND OF THE INVENTION

The present invention relates to a broadcast station synchronization technique in a digital TV broadcast reception system and in particular, to a broadcast station synchronization method for comparing the reference time information of the broadcast station side to the audio reproduction time of the mobile terminal which receives the information, acquiring a difference of the time elapse of them, and performing control to adjust the audio reproduction time, thereby eliminating the difference and a technique which can effectively be applied to the mobile terminal.

The inventor of the present invention has examined the following techniques associated with the broadcast station synchronization in the conventional digital TV broadcast reception system.

For example, as a synchronization method for a digital TV broadcast receiver with a broadcast station, JP-A-2004-23136 (FIG. 1) suggests a method for using a inexpensive non-feedback type oscillator, instead of a voltage feedback type oscillator such as a VCO (Voltage Controlled Oscillator), to compare the broadcast station reference time information PCR (Program Clock Reference) to a reproduction audio time stamp so as to detect a difference and correct the difference, thereby synchronizing with the broadcast station.

SUMMARY OF THE INVENTION

However, the inventor of the present invention has found that the aforementioned broadcast station synchronization technique in the digital TV broadcast reception system has problems as follows.

For example, since the system clock of the mobile phone has a frequency mainly for communication, it is not synchronized with and has a different frequency from the broadcast station reference clock of 27 MHz required for receiving digital TV broadcast. By mounting a VCO and a PLL of 27 MHz like a fixed receiver, it is easy to synchronize with the broadcast station but the cost and the mobile telephone size are increased and there arises a problem such as an unnecessary radiation caused by addition of another clock. Furthermore, additional parts used increase the power consumption and the viewing-enabled time is shortened.

Moreover, in the broadcast station synchronization method disclosed in JP-A-2004-23136, only one clock is used to synchronize with the broadcast station and the number of data of the PCM data is adjusted so that audio reproduction is performed with sampling frequency fs inherent to the PCM data. Accordingly, adjustment of the number of data causes overlapped reproduction of the same data or thinning of data in the middle when reproduced. That is, distortion is caused in reproduced audio.

It is therefor an object of the present invention to provide a broadcast station synchronization technique capable of improving the synchronization accuracy of the broadcast station synchronization while suppressing the distortion of the reproduced audio by using only the communication system clock provided in the mobile terminal without adding parts such as a 27-MHz VCO to the mobile terminal for receiving a digital TV broadcast in the mobile terminal.

The aforementioned object and the other objects of the present invention will be made clear by the description of the present Specification and the attached drawings.

The inventions disclosed in this application can be outlined as follows.

According to the present invention, the fs setting value of the PCM data to be reproduced is adjusted so as to eliminate a temporal difference between the audio reproduction at the mobile terminal and the reference clock of the broadcast station, thereby performing synchronization. Here, for performing a comparison to decide whether a difference is caused, the aforementioned two time information for a certain period are obtained more accurately, thereby achieving the aforementioned object.

For this, a DMAC transfer completion interrupt of the DMAC (Direct Memory Access Controller) used for PCM data transfer is used as a latch trigger of the internal reference clock count unit reproducing the clock synchronized with the broadcast station. Thus, it becomes possible to obtain the reference clock time of the broadcast station identical to the audio reproduction time and acquire the aforementioned two times within the same period more accurately.

Moreover, as a method for correcting the difference between the aforementioned two times, instead of increasing or reducing the number of PCM data outputted to the audio-DAC, the fs value in the audio reproduction unit is varied so as to adjust the PCM data timing outputted to the audio-DAC.

In this case, the fs value for outputting the PCM data to the audio-DAC is adjusted in plus or minus direction within a range permitted for human auditory sense characteristics for the original fs, so that the output time can be made later/earlier as compared to the time when the output is performed to the audio-DAC with the fs inherent to the PCM data. Accordingly, without increasing or decreasing the number of PCM data, it is possible to adjust the audio reproduction time and to perform audio reproduction while suppressing the distortion. Furthermore, there is no uncomfortable feeling attributed to the correction of the fs when performing audio-DAC transfer.

By using the aforementioned method, it is possible to perform synchronization with a broadcast station while suppressing the distortion of the reproduced audio and provide a small-size mobile terminal at a reasonable cost.

BRIEF DESCRIPTION OF THE DRAWINGS

There and other features, objects and advantages of the present invention will become more apparent from the following description when taken in conjunction with the accompanying drawings wherein.

DESCRIPTION OF THE EMBODIMENTS

Description will now be directed to embodiments of the present invention with reference to the attached drawings. It should be noted that in principle, like members are denoted by like reference symbols and their repeated explanations are omitted. The present invention can be applied to mobile terminals in general such as a mobile telephone, a PHS (Personal Handy-phone System), and a PDA (Personal Digital Assistant) but explanation will be given on the mobile telephone as an example.

As an embodiment of the present invention, referring to FIG. 1 to FIG. 8, explanation will be given on the method for improving synchronization accuracy in the broadcast station synchronization when receiving a digital TV broadcast by using a mobile terminal not having a clock generator of frequency identical to the broadcast station reference clock of 27 MHz.

The present embodiment is applied to a mobile terminal having a digital TV broadcast reception function. Here, explanation will be given on a case using a mobile telephone as an example of the mobile terminal. However, this does not limit the device of the reception side applied to the present invention. The same configuration can be used for other than the mobile telephone.

Figure 1:
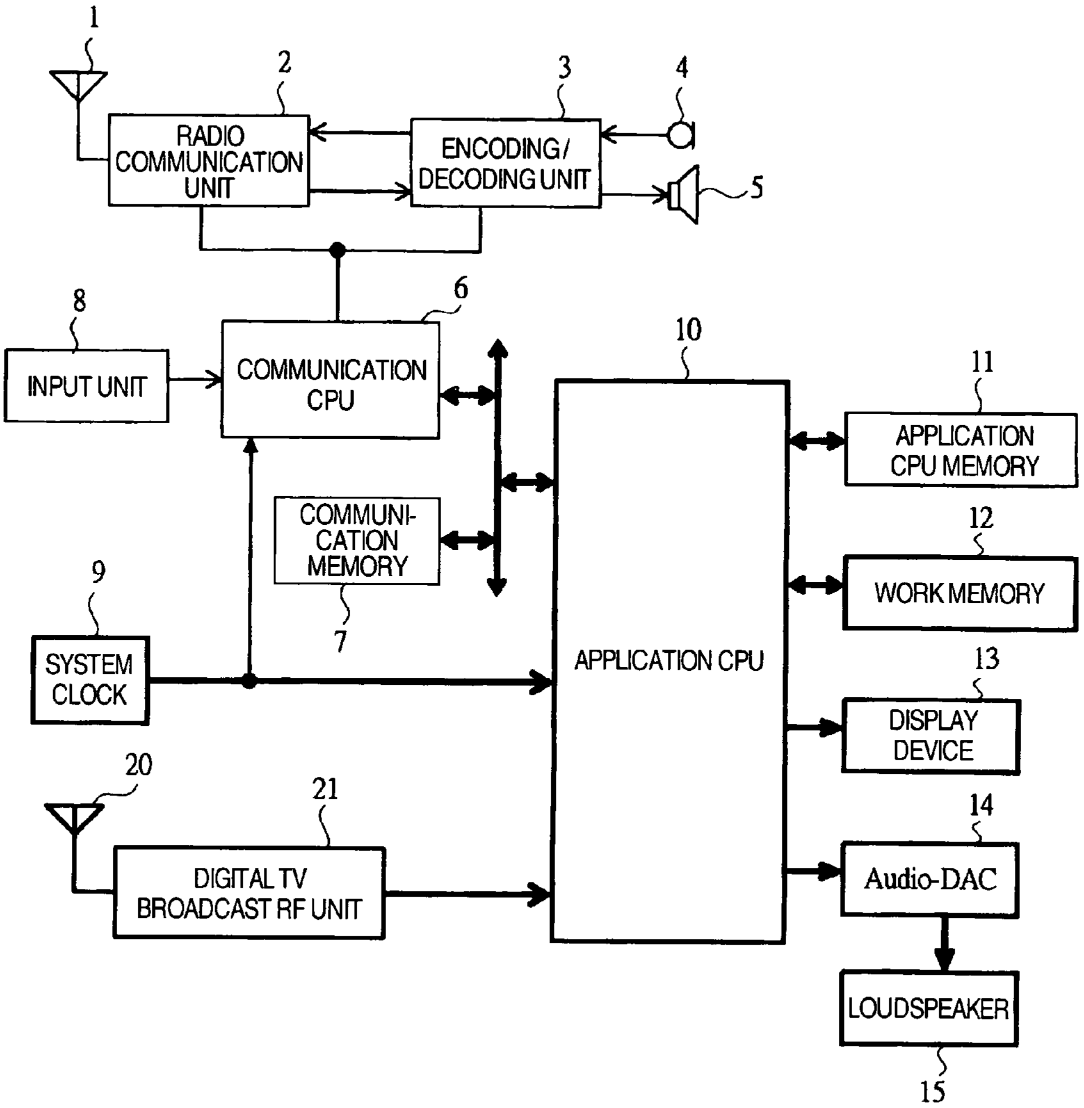
FIG. 1 is a block diagram showing an example of configuration of a mobile telephone according to an embodiment of the present invention.

FIG. 1 is a block diagram showing an example of configuration of a mobile telephone according to an embodiment of the present invention.

The mobile telephone in the present embodiment includes an antenna 1, a radio communication unit 2, an encoding/decoding unit 3, a microphone 4, a receiver 5, a communication CPU 6, a communication memory 7, an input unit 8, a system clock 9, an application CPU 10, an application CPU memory 11, a work memory 12, a display device 13, an audio-DAC (Digital Analog Converter) 14, a loudspeaker 15, a digital TV broadcast reception antenna 20, a digital TV broadcast radio-frequency unit 21, and the like.

The antenna 1 converts an electric wave into a high-frequency electric signal and performs opposite conversion. The radio communication unit 2 demodulates the radio-frequency electric signal and modulates the output signal of the encoding/decoding unit 3. The encoding/decoding unit 3 decodes the output signal of the radio communication unit 2, outputs it to the receiver 5 and the communication CPU 6, encodes the output signal of the communication CPU 6 and the microphone 4, and outputs it to the radio communication unit 2. The communication CPU 6 mainly performs processing control associated with the communication of the telephone. The communication memory 7 stores a program of the communication CPU 6 and the like. The input unit 8 may include a numeric key and a cursor key. The system clock 9 is a clock signal of the mobile telephone which is different from the 27-MHz clock.

The application CPU 10 mainly performs processing and control associated with the application of the mobile telephone. The application CPU memory 11 stores a program of the application CPU and the like. The work memory 12 is a memory used as a work area when executing an application. The display device 13 is an LCD (Liquid Crystal Display) or the like. The audio-DAC 14 converts PCM data into an analog audio signal.

The digital TV broadcast reception antenna 20 receives an electric wave of the digital TV broadcast and converts it into a radio-frequency electric signal. The digital TV broadcast radio-frequency unit 21 includes a radio-frequency circuit for demodulating a radio-frequency electric signal outputted from the digital TV broadcast reception antenna 20.

Figure 2:
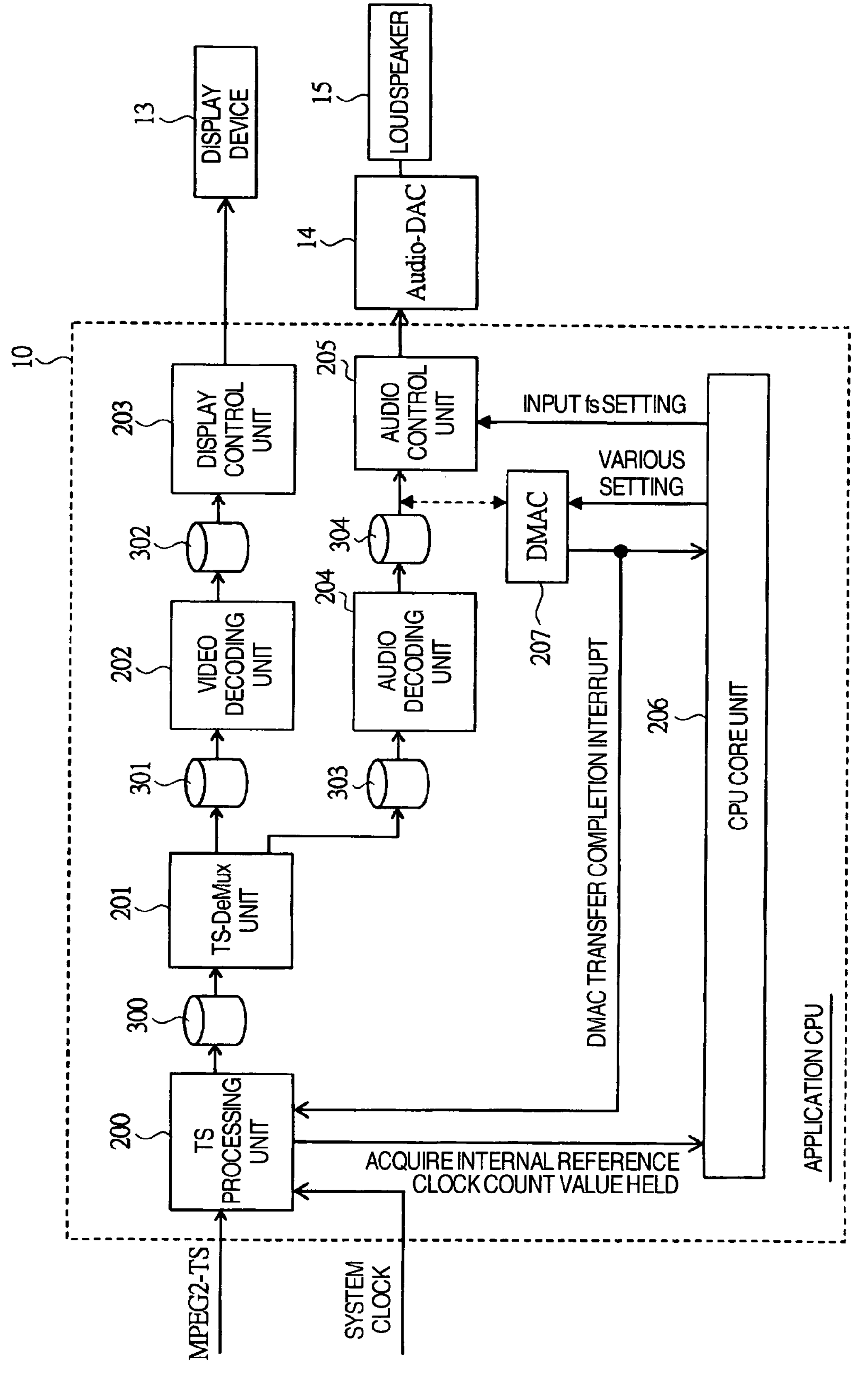
FIG. 2 shows an example of configuration of an application CPU required for receiving a digital TV broadcast and an example of video/audio data flow in the embodiment of the present invention.

FIG. 2 shows an example of configuration of the application CPU 10 required for receiving a digital TV broadcast and an example of video/audio data flow.

The application CPU 10 includes: a TS processing unit 200 for isolating a broadcast station reference time information PCR (Program Clock Reference) from the MPEG2-transport stream (hereinafter, referred to as MPEG-TS) which is a protocol used in the digital broadcast specification outputted from the digital TV broadcast high-frequency unit 21; a TS-DeMux unit 201 for separating the MPEG2-TS into a moving picture elementary stream (hereinafter, referred to as video-ES) and audio elementary stream (hereinafter, referred to as audio-ES); a video decoding unit 202 for decoding the separated video-ES and converting it into plot data which can be displayed on the display device 13; a display control unit 203 for transmitting the plot data to the display device 13; an audio decoding unit 204 for decoding the separated audio-ES and converting it into PCM data; an audio control unit 205 for transmitting the PCM data to the audio-DAC 14 and setting the sampling frequency (hereinafter, referred to as fs) when reproducing the PCM data; a CPU core unit 206 for controlling the aforementioned processes and calculating the audio reproduction time and the like; and a DMAC 207 for transmitting the PCM data at a high speed instead of the CPU between the work memory 12 and the audio control unit 205, for example. The application CPU 10 further includes a TS buffer 300 for temporarily holding various data generated by the aforementioned processes, a video-ES buffer 301, a plot data buffer 302, an audio-ES buffer 303, and PCM data buffer 304.

The TS processing unit 200 is supplied with the system clock 9 as a source clock for generating the internal reference clock and a DMAC transfer completion interrupt outputted from the DMAC 207 upon completion of the PCM data transfer of the set number of samples. Moreover, at an arbitrary timing, it is possible to read out a value from the CPU core unit 206.

The DMAC 207 can set the number of DMA (Direct Memory Access) transfers and transfers the PCM data of the number of samples for the set number of times. The DMA transfer is performed repeatedly until the digital TV broadcast ends or the user performs the viewing end operation. Moreover, when the PCM data transfer of the set number of samples is complete, the DMAC 207 outputs a DMAC transfer completion interrupt. The DMAC transfer completion interrupt is inputted to the CPU core unit 206 so as to be used as a timing signal calculating the audio reproduction time by the CPU core unit 206. Furthermore, the DMAC transfer completion interrupt is also inputted to the TS (Transport Stream) processing unit 200 and used for latching the count value of the internal reference clock count unit 402 which will be detailed later. Thus, it is possible to acquire the elapse time of the clock synchronized with the broadcast station at the same moment as the audio reproduction time and obtain the two times within the same period more accurately, thereby improving the synchronization accuracy between the broadcast station and the mobile telephone.

Each of the buffers 300, 301, 302, 303, and 304 handles large-size data and in general, the work memory 12 is divided into several parts to be allocated for various buffers. However, it is also possible to use the built-in memory provided in the application CPU. Moreover, it is possible to allocate each of the buffers by dividing them into the external work memory 12 and the internal memory.

Figure 3:
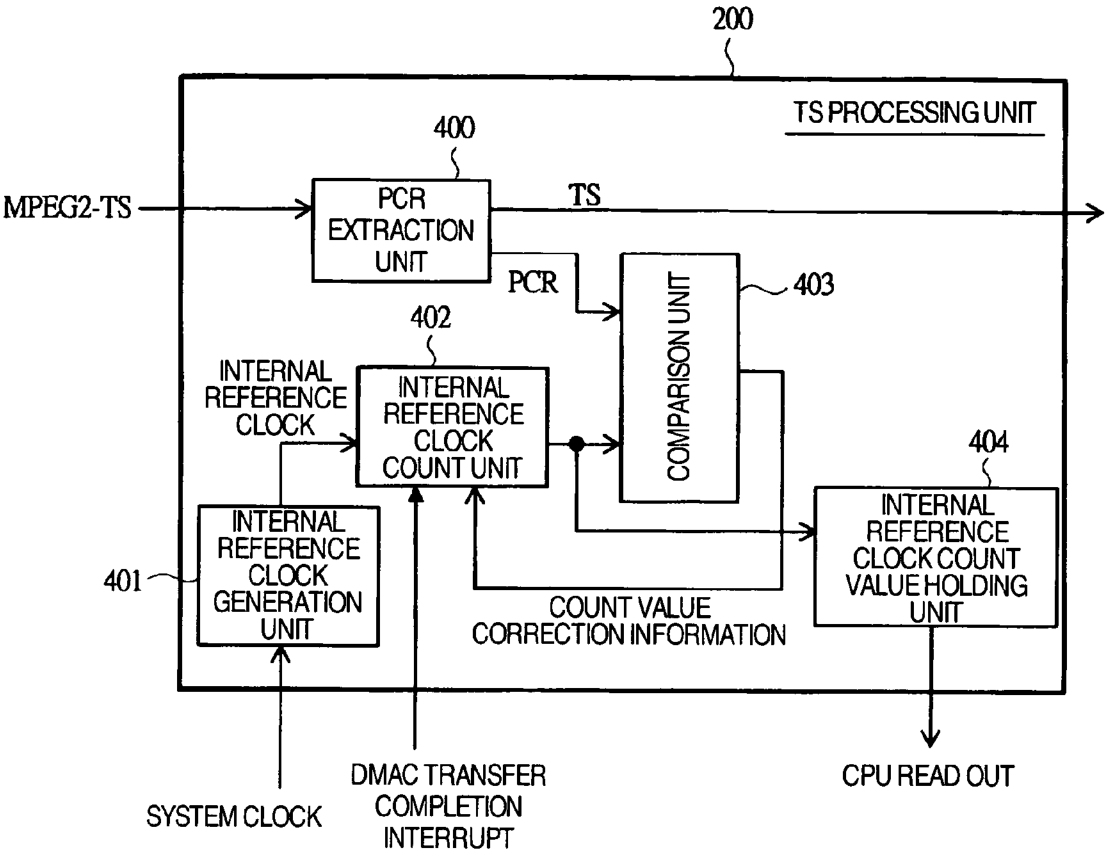
FIG. 3 is a block diagram showing an example of configuration of a TS processing unit in the embodiment of the present invention.

FIG. 3 shows an example of configuration of the TS processing unit 200.

The TS processing unit 200 includes: a PCR (Program Clock Reference) extraction unit 400 for isolating a PCR from the MPEG2-TS inputted from the digital TV broadcast high frequency unit 21; an internal reference clock generation unit 401 for generating an internal reference clock from the system clock of the mobile telephone; an internal reference clock count unit 402 for reproducing the clock synchronized with the broadcast station by the correction by the PCR; a comparison unit 403 for comparing the PCR value outputted from the PCR extraction unit 400 to thee count value of the internal reference clock count unit 402 and outputting count value correction value information to the internal reference clock count unit 4402 when the two values are different from each other; and an internal reference clock count value holding unit 404 for holding the count value latched by the internal reference clock count unit 402 by using the DMAC transfer completion interrupt signal as a trigger and enabling read out from the CPU core unit 206 at an arbitrary timing.

The internal clock count unit 402 counts up by the internal reference clock and when the count value is different from the PCR value, the count value is replaced by the PCR value according to the count value correction information. Since the PCR is broadcast station reference clock information, if the internal reference clock count unit 402 can perform count up operation to follow the PCR, it means that the internal reference clock count unit 402 reproduces the time elapse following the clock synchronized with the broadcast station.

Since the correction of the internal reference clock count unit 402 is performed only when the PCR is received, no correction is performed while no PCR is received. During the period when no correction by the PCR is performed, it is assumed that the internal reference clock advances like the clock synchronized with the broadcast station, and only the count up by the internal reference clock is performed.

Figure 4:
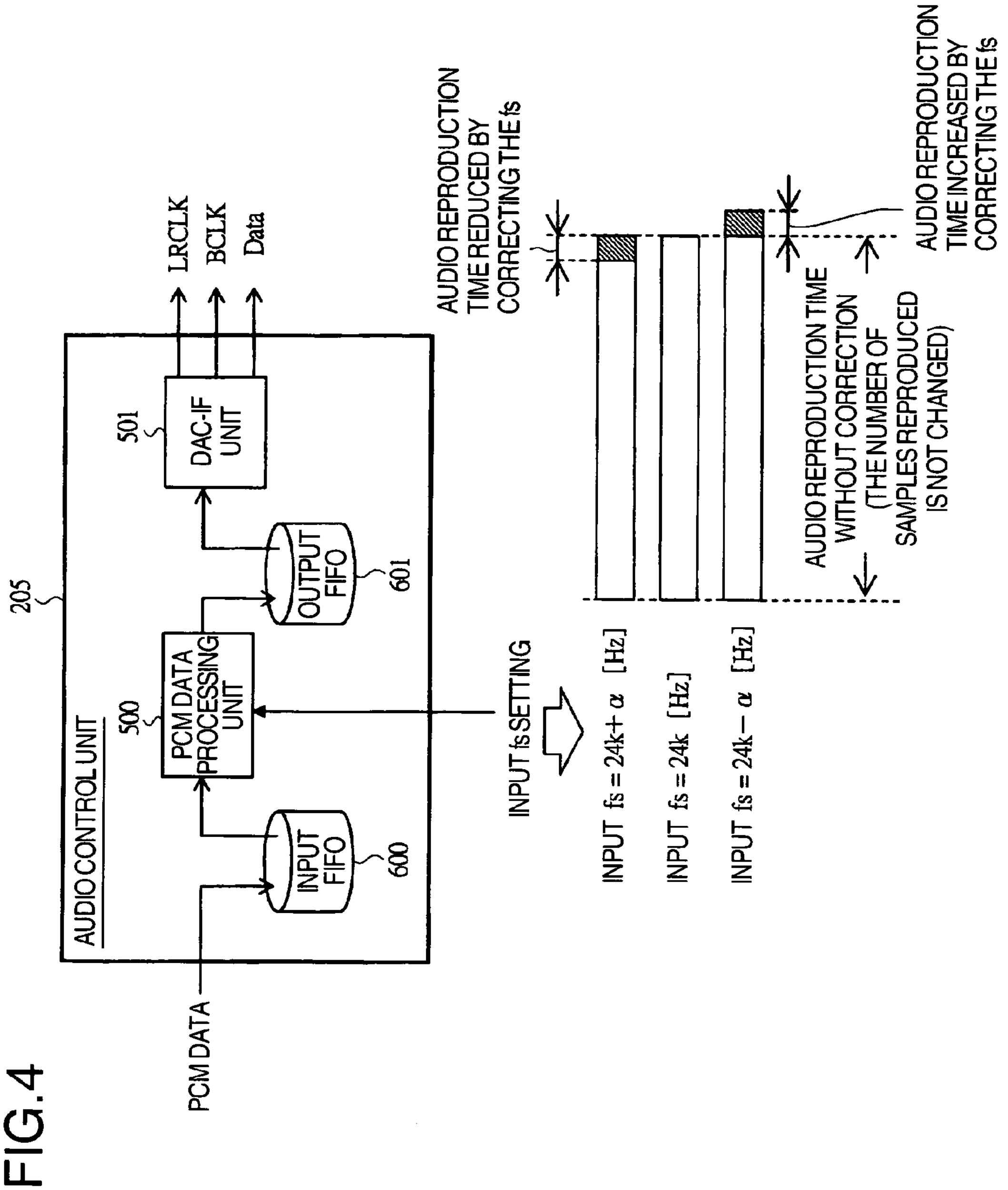
FIG. 4 is a block diagram showing an example of configuration of the audio control unit in the embodiment of the present invention.

FIG. 4 shows an example of configuration of the audio control unit 205.

The audio control unit 205 includes a PCM data processing unit 500 for setting fs of the PCM data, stereo/monaural, etc; a DAC-IF unit 501 for converting the PCM data into LRCLK/BCCLK/Data so as to be outputted to the audio-DAC 14; an input FIFO (First In First Out) 600 for buffering the input/output PCM data; and an output FIFO 601.

The fs should be set in advance for the PCM data processing unit 500. In order to perform accurate audio reproduction, it is necessary to accurately set the fs of the PCM data. However, there is no need of setting the same value as the fs of the PCM data. Details will be given later. For example, the relationship between the input fs and the audio reproduction time is as follows. For the input fs=24 k [Hz] (=audio reproduction time without correction of the fs), the following adjustment is made: input fs=24 k+$\alpha$ [Hz] (=fs is corrected to shorten the audio reproduction time), input fs=224 k−$\alpha$ [Hz] (=fs is corrected to increase the audio reproduction time).

Moreover, the PCM data processing unit 500 can performs fs conversion by the filtering processing or the like so that output is enabled with an output fs different from the fs of the inputted PCM data to the audio-DAC. This is a method effective for a mobile telephone having no master clock for audio reproduction. Like the broadcast station synchronization, the fs which can be generated by the system clock of the mobile telephone is set as an output fs in the PCM data processing unit 500 for performing the PCM data reproduction.

Since the input FIFO 600 has a very small capacity as compared to the length of the content to be reproduced, it is necessary to monitor the data in the input FIFO 600 so that no underflow or overflow is caused and if necessary, transfer of the next data is requested to the DMAC 207.

Next, referring to FIG. 5 to FIG. 8, explanation will be given on a method for improving the accuracy of the synchronization with the broadcast station by using operation flow for synchronization with the broadcast station required for receiving the digital TV broadcast by a mobile telephone.

Figure 5:
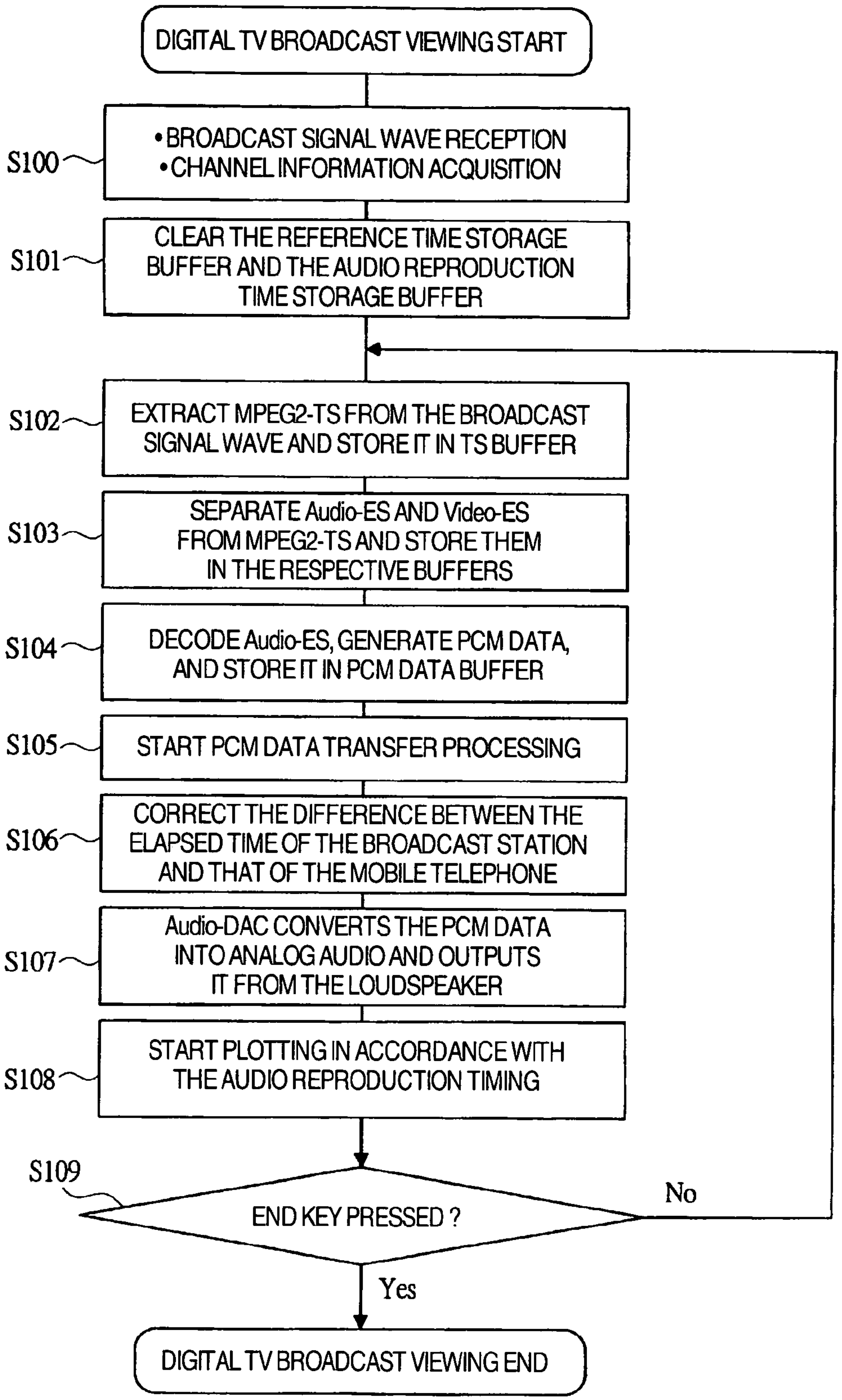
FIG. 5 is a main flowchart showing an example of series of operations from the view start in the embodiment of the present invention.
Figure 6:
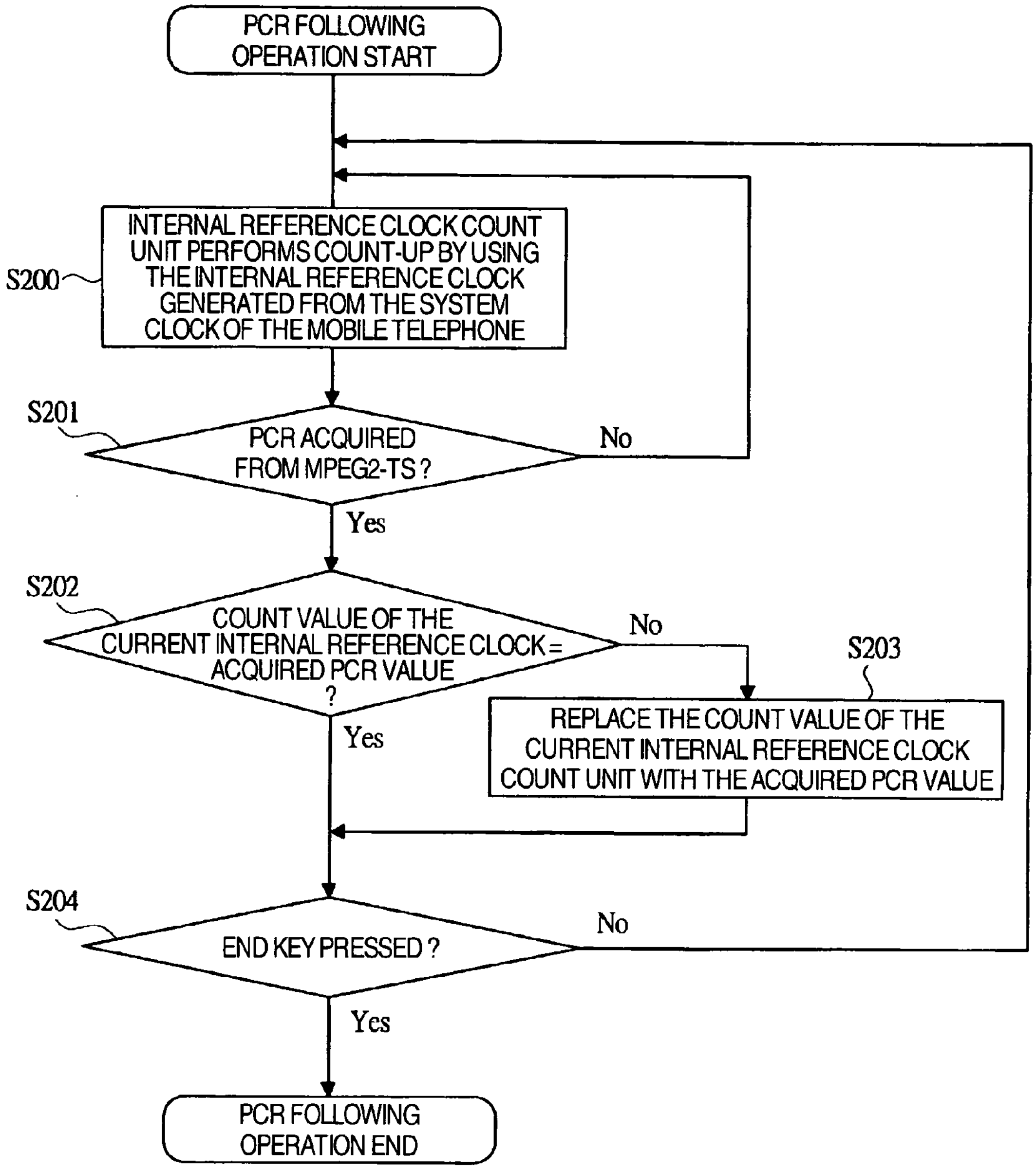
FIG. 6 is a flowchart showing the operation of the mobile telephone internal reference clock to follow the PCR of the broadcast station processed in the TS processing unit in the broadcast synchronization processing in the embodiment of the present invention.
Figure 7:
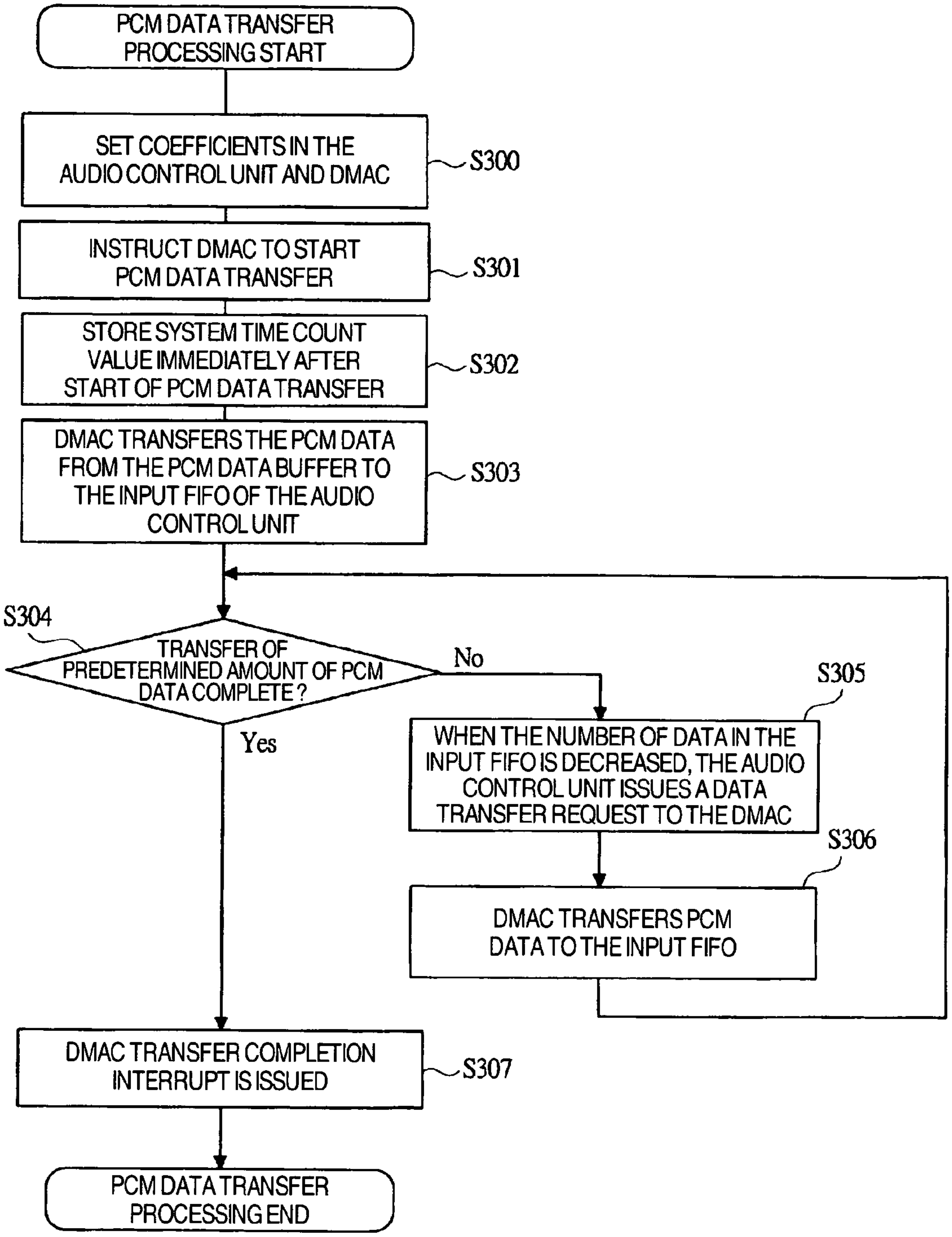
FIG. 7 is a flowchart showing a detailed example of the operation of "the PCM data transfer processing" in the main flowchart of FIG. 5 in the embodiment of the present invention.
Figure 8:
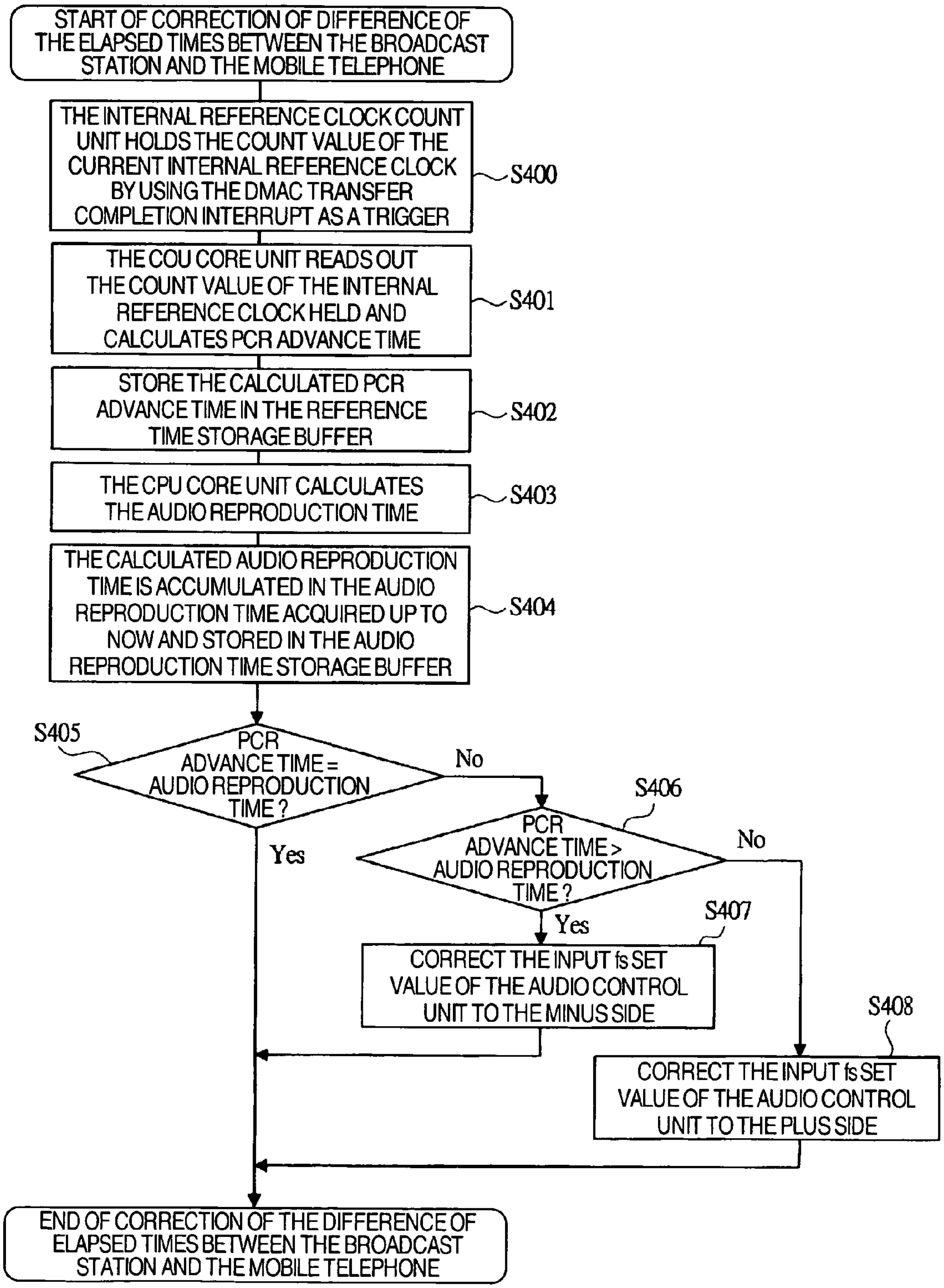
FIG. 8 is a flowchart showing a detailed example of the operation of "the processing for correcting the difference between the time elapses of the broadcast station and the mobile telephone."

FIG. 5 is a main flowchart indicating an example of series of operations from the view start. FIG. 6 is a flowchart showing an example of operation for making the internal reference clock of the mobile telephone follow the PCR of the broadcast station processed in the TS processing unit 200 in the broadcast station synchronization processing. FIG. 7 is a flowchart showing details of the operation of "the PCM data transfer processing" in the main flowchart of FIG. 5. FIG. 8 is a flowchart showing details of the operation of "the processing for correcting the difference of the time elapse between the broadcast station and the mobile telephone" in the main flowchart of FIG. 5.

Firstly, as shown in FIG. 5, when the user operates the input unit 8 to start viewing of the digital TV broadcast, channel information is interpreted from the electric wave received by the digital TV broadcast antenna 20 and initialization is performed (S100). Subsequently, the reference time storage buffer and the audio reproduction time storage buffer required for performing the broadcast station synchronization are initialized (S101). These two buffers are normally allocated in the work memory 12 but if the memory built in the application CPU 10 is available, it can be used.

The TS processing unit 200 extracts MPEG2-TS from the received electric wave and stores it in the TS buffer 300 (S102). Here, the PCR required for the internal reference clock count unit 402 to follow the clock synchronized with the broadcast station is also extracted. The MPEG2-TS stored in the TS buffer 300 is divided into the video-ES and the audio-ES by the TS-DeMux unit 201 so as to be stored in the video-ES buffer 301 and the audio-ES buffer 303, respectively (S103). Since the AV synchronization is based on the audio reproduction timing, while audio processing is performed, the video-ES stored in the video-ES buffer is decoded by the decoding unit 202 and transferred from the display control unit 203 to the display device 13 in accordance with the audio reproduction timing, thereby performing plot processing (S108).

The audio-ES stored in the audio-ES buffer 303 is decoded by the audio decoding unit 204, converted into the PCM data, and stored in the PCM data buffer 304 (S104). The PCM data in the PCM data buffer 304 is transferred to the audio control unit 205 by the DMAC 207 (S105) and audio reproduction is performed (S107). Here, the audio reproduction time is compared to the count up time of the internal reference clock count unit 4402 reproducing the clock synchronized with the broadcast station so as to obtain a difference (delay/advance)

of an audio reproduction time. The input fs set in the PCM data processing unit 500 is corrected so as to eliminate the difference (S106)and the audio reproduction time of the mobile telephone is telephone is matched with the time elapse of the broadcast station, thereby synchronizing the mobile telephone with the broadcast station for viewing the program. Here, the correction width of the input fs is set within a range permissible for human auditory characteristic, thereby suppressing the reproduced audio distortion or artificiality. The S105 and S106 are the point for improving the synchronization accuracy of the broadcast station synchronization and they will be detailed with reference to FIG. 6 and FIG. 7.

When terminating the viewing of the digital TV broadcast, the user presses the end key (S109). If the end key is not pressed (No in S109), the MPEG2-TS is again extracted from the broadcast signal wave (S102) and viewing is continued while maintaining synchronization with the broadcast station. When the end key is pressed (Yes in S109), all the processes are terminated and the viewing is terminated.

Subsequently, referring to FIG. 6, explanation will be given on the operation for making the internal reference clock of the mobile telephone follow the PCR of the broadcast station.

As shown in FIG. 6, when the PCR following operation is started, the internal reference clock is generated using the system clock 9 inputted to the internal reference clock generation unit 401 as a source clock. The internal reference clock count unit 402 performs count up operation by the internal reference clock (S200). The PCR extraction unit 400 acquires the PCR superimposed on the MPEG2-TS (S201). This is used to make the internal reference clock follow the clock synchronized with the broadcast station. When the PCR cannot be extracted, the internal reference clock count unit 402 does not perform correction processing and continues only the count up operation by the internal reference clock (No in S201).

When the PCR can be extracted (Yes in S201), the value of the extracted PCR is compared to the count value of the current internal reference clock count unit 402 (S202). If the two values coincide (Yes in S202), it is judged that the time of the clock synchronized with the broadcast station and the time of the internal reference clock advance in the same way and the count up operation by the internal reference clock is continued until the next PCR is received without correcting the count value of the internal reference clock count unit 402.

When the two values do not coincide (No in S202), it is judged that there is a difference between the time of the clock synchronized with the broadcast station and the time of the internal reference clock and there arises a need of matching the internal reference clock with the clock synchronized with the broadcast station. For this, the count value of the current internal reference clock count unit 4402 is replaced by the value of the PCR extracted by the PCR extraction unit 400 (S203) and the count up operation by the internal reference clock is continued until the next PCR is received. The aforementioned PCR following processing of the internal reference clock continues without halt while receiving the digital TV broadcast (No in S204). When the end key is pressed (Yes in S204), the PCR following operation terminates.

Subsequently, referring to FIG. 7, explanation will be given on the PCM data transfer processing flow (S105) in the main flowchart of FIG. 5.

As shown in FIG. 7, when the PCM data transfer processing is started, the PCM data decoded by the audio decoding unit 204 is stored in the PCM data buffer 304 and during the decoding, the parameter extractions from the audio data is performed. The CPU core unit 206 sets the parameters in the audio control unit 205 (S300). The parameters set here include the input fs value and stereo/monaural information. Moreover, the CPU core unit 206 also sets the number of transferred samples and the transfer method in the DMAC 207.

When the parameter setting is complete and the PCM data is stored in the PCM data buffer 304, the CPU core unit 2206 instructs the DMAC 207 to start the PCM data transfer (S301). Here, the CPU core unit 206 stores the count value of the internal reference clock count unit 402 at the PCM data transfer start (S302). The count value at the PCM data transfer start is used when calculating the time elapse of the clock synchronized with the broadcast station.

When the DMAC receives the PCM data transfer start instruction from the CPU core unit 206, it successively transfers the PCM data stored in the PCM data buffer 304 to the input FIFO 600 of the audio control unit 205 (S303). The PCM data transferred to the input FIFO 600 is transferred to the audio-DAC 14 at the cycle of the input fs value set in S300. After this, it is checked whether the PCM data corresponding to the number of samples set in S300 has been transferred (S304).

When transfer of the set number of samples has not been completed (No in S304), audio reproduction is performed so as to reduce the PCM data in the input FIFO 600. The audio control unit 205 issues the next PCM data transfer request to the DMAC 207 (S305) and the next PCM data is transferred from the PCM data buffer 304 to the input FIFO 600 (S306). The steps S304 and S305 are repeatedly performed until the number of samples set in S300 are transferred to the audio control unit 205.

When the transfer of the set number of samples is complete (Yes in S304), the DMAC 207 outputs a DMAC transfer completion interrupt to the CPU core unit 206 and the internal reference clock count unit 402 (S307). Control is returned to the main flow of FIG. 5 so as to perform the synchronization processing with the broadcast station as the next step (S106).

After output of the DMAC transfer completion interrupt, control is returned temporarily to the main flow for performing the synchronization processing with the broadcast station (S106). However, while viewing of the digital TV broadcast continues, control is immediately returned to the PCM data transfer processing flow and the next PCM data transfer processing is performed before the audio to be reproduced is terminated.

In the PCM data transfer processing performed for the second time and after, the input fs set value for adjusting the audio reproduction time has been corrected. By correcting the input fs set value, there arises a difference between the time when the PCM data is reproduced and the time when actually outputted to the audio-DAC 14 to be reproduced. This difference is used to correct the difference between the time elapse of the clock synchronized with the broadcast station reproduced by the internal reference clock count unit 402 and the audio reproduction time of the mobile telephone, thereby performing synchronization with the broadcast station.

Subsequently, referring to FIG. 8, explanation will be given on the processing flow (S106) for correcting the difference between the time elapse of the broadcast station and that of the mobile telephone in the main flow of FIG. 5.

When this processing flow is executed, the internal reference clock count unit 402 follows the clock synchronized with the broadcast station by the PCR following operation of the internal reference clock shown in FIG. 6. Furthermore, by the PCM data transfer processing shown in FIG. 7, the PCM data of the number of the samples set in S300 is transferred to the audio control unit 205 and the DMAC transfer completion interrupt is outputted from the DMAC 207 to the CPU core unit 206 and the internal reference clock count unit 402.

Only the internal reference clock count unit 402 reproduces the clock synchronized with the broadcast station in the mobile telephone. In order to increase the synchronization accuracy, it is necessary to acquire more accurate audio reproduction time and the elapsed time of the clock synchronized with the broadcast station. Within the same period, the time required for reproducing the predetermined number of samples of the PCM data in the mobile telephone is used as the period for acquiring the more accurate audio reproduction time and the elapsed time of the clock synchronized with the broadcast station. Since the time required for reproducing the PCM data is the most accurate and stable time in the mobile telephone, the time required for reproducing a predetermined number of samples of PCM data is used as a unit period for comparing the elapsed time of the clock synchronized with the broadcast station to the audio reproduction time of the mobile telephone.

As for the method for accurately acquiring the elapsed time of the clock synchronized with the broadcast station and the audio reproduction time within the same period, the audio reproduction time of the mobile telephone can be calculated by Expression (1) according to the fs set value of the PCM data to be reproduced and the number of samples as follows.

audio reproduction time=1/fs set value×number of samples [sec] (1)

On the other hand, the time per unit period in the elapsed time of the clock synchronized with the broadcast station is made a reference time, which can be calculated by following Expression (2) according to the count value at the transfer start point of the PCM data in the internal reference clock count unit 402 and the count value at the moment of completion of transfer of a predetermined number of samples of PCM data to the audio control unit 205 as follows.

reference time=(count value at transfer start−count value at transfer end)×1/internal reference clock [sec] (2)

For this, it is necessary to obtain the count value of the internal reference clock count unit 402 at the moment of completion of transfer of the predetermined number of samples of PCM data. When this count value is near to the moment of completion of transfer of the PCM data, it is possible to improve the accuracy of the elapsed time of the clock synchronized with the broadcast station. For this, the PCM data transfer completion interrupt signal is inputted directly to the internal reference clock count unit 402 so as to latch the internal reference clock count unit 402 by the interrupt signal at the moment of transfer completion, so that the count value is held by the internal reference clock count value holding unit 404. Thus, it becomes possible to obtain the count value of the internal reference clock count unit 402 at the moment of transfer completion, thereby improving the synchronization accuracy.

As shown in FIG. 8, when correction of the difference in the elapsed time between the broadcast station and the mobile telephone is started, the internal reference clock count unit 402 latches the count value by using the DMAC transfer completion interrupt as a trigger and holds it in the internal reference clock count value holding unit 404 (S400). The CPU core unit 206 reads out the count value upon generation of the DMAC transfer completion interrupt held in the internal reference clock count value holding unit 404 and calculates the reference time by using Expression (2) (S401).

The reference time is the a time from the PCM data transfer start to the output of the DMAC transfer completion interrupt signal and can be obtained by a difference between the count value of the internal reference clock latched by using the DMAC transfer completion interrupt signal as a trigger and the count value of the internal reference clock immediately after the start of the PCM data transfer. The calculated reference time is stored in a reference time storage buffer (S402).

Subsequently, the CPU core unit 206 calculates the audio reproduction time by using Expression (1) (S403). The reference time is a time from the PCM data reproduction start to the current time while the audio reproduction time is a time for a predetermined number of samples and not the time from the reproduction start. The CPU core unit 206 accumulates the audio reproduction time for a predetermined number of samples obtained by the calculation from the PCM data transfer start and stores it in an audio reproduction time storage buffer (S404).

Next, check is made to detect whether a difference is present between the reference time obtained from the clock synchronized with the reproduced broadcast station and the audio reproduction time of the mobile telephone (S405). When no difference is present (Yes in S405), it is judged that the time advance in the broadcast station is identical to the time advance of the mobile telephone. Control is returned to the main flow of FIG. 5 without performing any correction and the audio reproduction operation is continued.

When a difference is present (No in S405), the input fs set value of the PCM data processing unit 500 upon reproduction of the PCM data is corrected so that the audio reproduction time advance of the mobile telephone is matched with the time advance of the broadcast station, thereby adjusting the audio reproduction time. Firstly, in order to correct the input fs set value of the PCM data processing unit 500, the advance of the audio reproduction time with respect to the reference time is checked. According to the check result, it is judged whether the input fs set value is corrected to the plus side or the minus side (S406).

When the audio reproduction time advances forward (Yes in S406), the PCM data reproduction time is faster and accordingly, the input fs set value at the next PCM data transfer is corrected to the minus side than the current input fs set value (S407). On the contrary, when the reference time advances forward (No in S406), the PCM data reproduction time is slower and accordingly, the input fs set value at the next PCM data transfer is corrected to the plus side than the current input fs set value (S408). The fs correction width here is assumed to be within a range permissible for the human auditory characteristics. 24 kHz and the number of samples transferred by the DMAC is 1024 samples, the PCM data of fs=24 kHz is reproduced at the timing of the input fs=24 kHz when no correction is performed by the input fs, and the PCM data reproduction time of the 1-24 samples becomes $\frac{1}{24000}\times 1024 \approx 42.667$ msec.

As compared to this, when the audio reproduction time advances forward, the reproduction time of the PCM data is faster and the input fs set value is corrected to the minus side so as to delay the PCM data reproduction time. For example, when 10 Hz correction is performed to the minus side, the PCM data of fs=24 kHz is reproduced at the timing of the input fs=23.990 kHz and the reproduction time of the 1024-sample PCM data becomes $\frac{1}{23990}\times 10224 \approx 42.684$ msec. As compared to the case when no correction of the input fs is performed, the reproduction time can be delayed by about 0.17 msec.

On the contrary, when the reference time advances forward, the PCM data reproduction time is slower and the input fs set value is corrected to the plus side so that the PCM data reproduction time advances forward. For example, when 10 Hz correction is performed to the plus side, the PCM data of fs=24 kHz is reproduced at the timing of fs=24.010 kHz and the 1024-sample PCM data reproduction time becomes $\frac{1}{24010}\times 1024 \approx 42.649$ msec. As compared to the case when no correction of the input fs is performed, the when no correction of the input fs is performed, the reproduction time can advance forward by about 0.18 msec.

By adjusting the audio reproduction time by the aforementioned method, it is possible not to change the number of data in the PCM data actually reproduced. Furthermore, the fs correction width can be set within a predetermined range permissible for the human auditory characteristic. Thus, it is possible to suppress the distortion and artificiality of the reproduced audio. In general, the range permissible for the human auditory characteristic is in the order of 0.2%. For example, when fs=24 kHz, the fs correction width is about 24 kHz±48 Hz.

According to the present embodiment, it becomes possible to realize improvement of synchronization accuracy in synchronization with the broadcast station in the mobile terminal while suppressing the distortion of the reproduced audio without using an additional part such as a VCO of 27 MHz. Thus, no additional part is used in the mobile terminal, it is possible to provide a small-size mobile terminal at a reasonable cost.

Furthermore, since increase of additional current consumption can be suppressed, it is possible to view a digital TV broadcast for a long continuous time.

Moreover, by performing the fs correction auditory characteristic, it is possible to suppress the affect of the pitch difference with respect to the reproduced audio by the correction.

The invention made by the inventors and thus far explained through the embodiment is not limited to the embodiment and can be modified without departing from the spirit of the invention.

The present invention relates to a broadcast station synchronization technique in the digital TV broadcast reception system, for example, and in particular to a mobile terminal having the digital TV broadcast reception function, and can be applied to a mobile telephone and reception side device having the similar configuration in general such as PHS and PDA.

While we have shown and described several embodiments in accordance with our invention, it should be understood that disclosed embodiments are susceptible of changes and modifications without departing from the scope of invention. Therefore, we do not intent to be bound by the details shown and described herein but intend to cover all such changes and modifications within the ambit of the appended claims.

The invention claimed is:

1. A broadcast station synchronization method in a mobile terminal which is mobile relative to a broadcast station and operating with a system clock different from a reference clock of the broadcast station, in which a received signal is decoded to produce a PCM data and the PCM data is transferred to a digital/analog converter for reproducing an audio signal, wherein a clock synchronized with the broadcast station is reproduced according to an internal reference clock generated by the system clock of the mobile terminal and corrected by a reference time information from the broadcast station, an elapsed time is compared to audio signal reproduction time at a predetermined time interval so as to detect a delay or advance difference of the audio signal reproduction time with respect to the elapsed time, the audio signal reproduction time is adjusted so as to cancel the difference, and in the transferring of the PCM data to the digital/analog converter for reproducing the audio signal, a signal indicating a completion of the transferring of the PCM data of a predetermined number of samples is used as a trigger for latching an internal reference clock count unit reproducing the clock synchronized with the broadcast station so as to acquire the clock time synchronized with the broadcast station of the same period as the audio signal reproduction time per a predetermined period, thereby performing synchronization of the reproduced audio signal with the broadcast station.

2. A broadcast station synchronization method in a mobile terminal which is mobile relative to a broadcast station and operating with a system clock different from a reference clock of the broadcast station, in which a received signal is decoded to produce a PCM data and the PCM data is transferred to a digital/analog converter (DAC) for reproducing an audio signal, wherein a clock synchronized with the broadcast station is reproduced according to an internal reference clock generated by the system clock of the mobile terminal and corrected based on a reference time information from the broadcast station, an elapsed time is compared to audio signal reproduction time at a predetermined time interval so as to detect a delay or advance difference of the audio signal reproduction time with respect to the elapsed time, the audio signal reproduction time is adjusted so as to cancel the difference, and during audio signal reproduction, a number of data in PCM data to be reproduced is not changed and the sampling frequency when outputting the PCM data to the DAC is adjusted, thereby performing synchronization of the reproduced audio signal with the broadcast station.

3. A broadcast station synchronization method in a mobile terminal which is mobile relative to a broadcast station and operating with a system clock different from a reference clock of the broadcast station, in which a received signal is decoded to produce a PCM data and the PCM data is transferred to a digital/analog converter (DAC) for reproducing an audio signal, wherein a clock synchronized with the broadcast station is reproduced according to an internal reference clock generated by the system clock of the mobile terminal and corrected by a reference time information from the broadcast station, an elapsed time is compared to audio signal reproduction time at a predetermined time interval so as to detect a delay or advance difference of the audio signal reproduction time with respect to the elapsed time, the audio signal reproduction time is adjusted so as to cancel the difference, in the transferring of the PCM data to the digital/analog converter for reproducing the audio signal, a signal indicating a completion of the transferring of the PCM data of a predetermined number of samples is used as a trigger for latching an internal reference clock count unit reproducing the clock synchronized with the broadcast station so as to acquire the clock time synchronized with the broadcast station of the same period as the audio signal reproduction time per a predetermined period, and during audio signal reproduction, a number of data in the PCM data to be reproduced is not changed and the sampling frequency when transferring the PCM data to the DAC is adjusted, thereby performing synchronization of the reproduced audio signal with the broadcast station.

* * * * *